Figure 1:
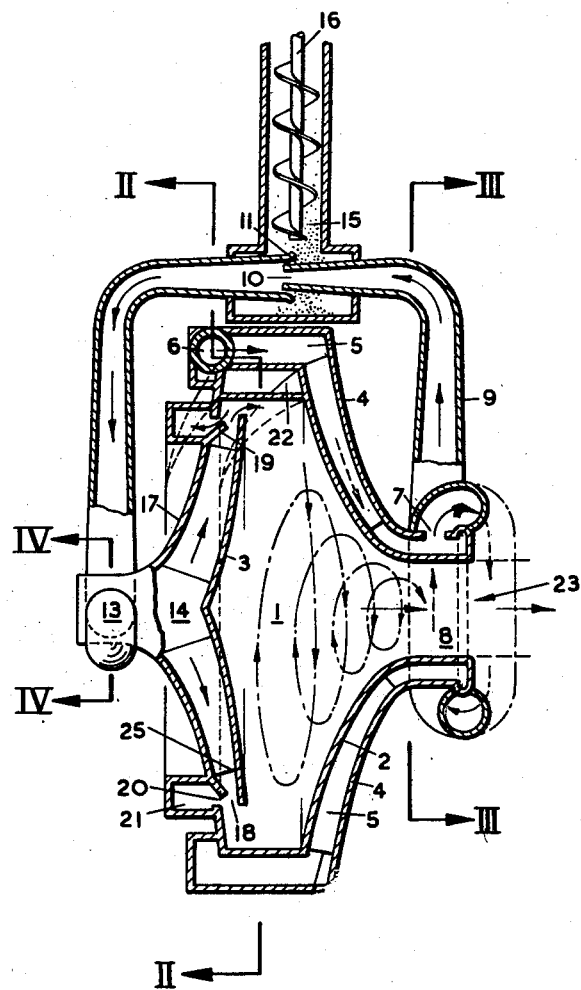

April 21, 1953     H. A. HAVEMANN     2,635,564
COMBUSTION SYSTEM FOR PULVERULENT FUEL
Filed Oct. 3, 1949     2 SHEETS—SHEET 1

Patented Apr. 21, 1953

2,635,564

UNITED STATES PATENT OFFICE 2,635,564

COMBUSTION SYSTEM FOR PULVERULENT FUEL

Hans A. Havemann, Bangalore, India, assignor to Power Jets (Research and Development) Limited, London, England, a British company Application October 3, 1949, Serial No. 119,315
In Great Britain September 15, 1948

1 Claim. (Cl. 110—28)

This invention relates to improvements in combustion systems for burning pulverulent fuel of the kind comprising a combustion chamber of circular section having an axial outlet for the gases of combustion and means for imparting to air entering said chamber a vortex motion around the axis thereof. Such a combustion system has been described in British patent specification No. 338,108. The invention is applicable to cases in which combustion has to be supported by a fast moving stream of fluid (hereinafter considered as being air), and an object of the invention is to adapt such a system for burning solid pulverulent fuel. The description "fast-moving" as applied to a combustion-supporting air stream is intended herein to indicate that the mean speed of the airstream in its general direction of flow past a combustion initiating zone, calculated from the ratio volume passing in unit time/cross sectional area of the flow path, is sufficiently high in relation to the speed of flame propagation in the fuel-air mixture concerned to have flame extinguishing properties. For hydrocarbon fuels burning in air the speed of flame propagation is considered as being of the order of one foot per second at an atmospheric temperature; the invention, on the other hand, is especially applicable to combustion apparatus for internal combustion gas turbine and/or jet propulsion power units in which the speed of the air stream in its general direction of flow past a combustion zone, calculated on the basis indicated, might be from 10 to 300 feet per second or even more, depending on the design. The invention is further of particular interest in relation to installations which, in common with such power units, require stabilised burning to be supported not only by a fast moving air stream but also with high air/fuel ratios, and in which stable burning is required to be maintained at high rates of fuel injection with a minimum of pressure loss.

According to the invention a combustion system for burning pulverulent fuel comprises a combustion chamber of circular section having an axial outlet for the gases of combustion and means for imparting to air entering said chamber a vortex motion around the axis thereof, said chamber being provided with a jacket through which a stream of coolant air can be passed, the outlet of said jacket leading to ducting forming an injector system and delivering into the combustion chamber whereby the vitiated coolant air can be used to entrain pulverulent fuel particles for combustion.

Preferably the coolant airstream is induced to undergo a radially inward vortex movement within the jacket about the axis of the chamber so that its pressure is thereby decreased and its velocity increased so as to enhance the required entrainment of fuel by the injector system. Preferably also the combustion chamber is provided with a main air supply constituting primary air and a secondary air supply constituting secondary air, the vitiated coolant air carrying the fuel particles entering the combustion chamber as secondary air. It is further preferred that the coolant airstream enters the jacket tangentially and peripherally, and that the outlet of the jacket leads tangentially to the injector ducting through a volute, the injector system leading tangentially into the combustion chamber through a second volute. The vitiated airstream carrying the fuel particles may be preheated by being passed over a wall of the combustion chamber before it enters the chamber and a part of this stream may be tapped off before entering the combustion chamber to mix with the primary air supply.

Figure 2:
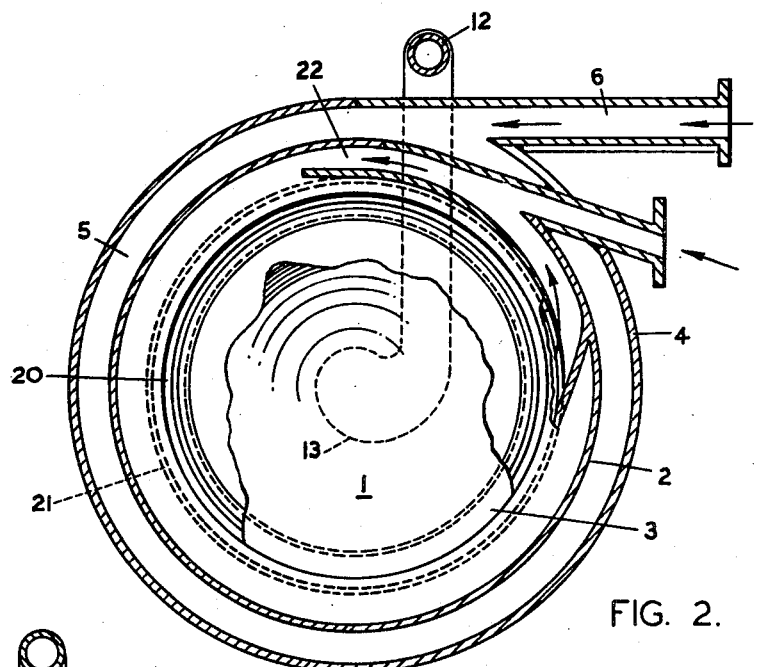
Figure 3:
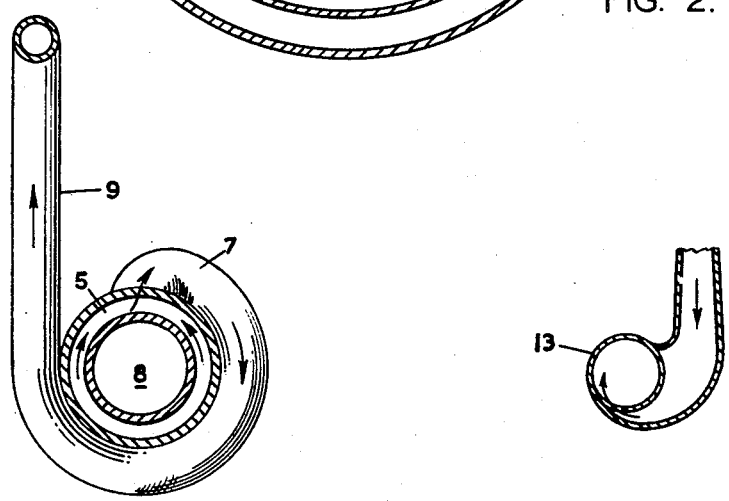
Figure 4:
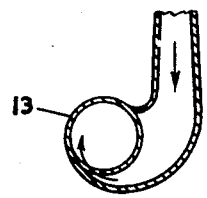

The accompanying drawings, of which Fig. 1 is an axial section, Fig. 2 is a section on line II of Fig. 1, Fig. 3 is a section on line III—III of Fig. 1 and Fig. 4 is a section on line IV—IV of Fig. 1.

In said drawing, a combustion chamber 1 of circular section is formed by inner walls 2, 3, having the outwardly concave shape shown and of which the wall 2 is surrounded by an outer wall 4 to enclose an annular space 5 into which coolant air from atmosphere may be led by means of a conduit 6 leading tangentially into the periphery of said space 5.

Air flows through this space 5 as a radially inward vortex and leaves tangentially through aperture 7 passing into the volute 8 of an exit conduit 9 as shown by the broken arrows.

During its passage through space 5 the air is warmed by transfer of heat from the wall 2 and this heat transfer may be increased by any suitable means, for example, fins or baffles 24 on the outer face of this wall serving as guide vanes within the space 5 to induce the required spiral flow of the coolant air.

Due to the decreasing section of flow of the coolant air on its path towards the volute 8, its pressure is decreased and its velocity increased over the corresponding values at the entry 6.

The conduit 9 is of continuously decreasing cross-section and at its narrowest end 10 enters the bell-mouthed entry 11 of a conduit 12 which is of continuously increasing cross-section. The relative diameters of the exit 10 and the entry 11 are such that the static pressure in this region is just below atmospheric pressure and consequently a small amount of air from atmosphere may be drawn in. This air is caused to flow through a supply of pulverulent fuel 15, delivered for example by an Archimedean screw 16, and thus entrains with it some of the fuel into conduit 12.

The air-fuel stream is then led through conduit 12 as shown by the full line arrows to an entry volute 13 leading to an annular space 14 formed between the wall 3 of combustion chamber 1 and an outer wall 17. The fuel-air stream travels radially outwards and tangentially in vortex manner through space 14 thereby becoming warmed by heat transfer from wall 3 until it reaches an annular opening 18 through which it passes into chamber 1 for combustion.

Over its path towards the opening 18, the air-fuel stream flows in the form of a spiral with gradually increasing cross-sectional area as in the case of a diffuser, the arrangement being preferably such that at the opening 18 the pressure of this stream is only slightly above the pressure already existing in chamber 1. The temperature of the fuel-air stream is increased by heat transfer from wall 3 and here again such heat transfer may be enhanced by the presence of fins or baffles 25 on wall 3.

As described in the above-mentioned prior specifications during combustion within the combustion chamber 1 the air and fuel flow over a vortex path within and around the axis of the chamber 1 whereby the fuel particles gyrate over a path of continuously decreasing radius as the particles diminish progressively in size during their combustion, and the gases of combustion together with any unburnt fuel particles leave the chamber 1 through the axial outlet 23.

As also described in the said prior applications, the velocities and paths of the particles in the combustion chamber 1 are determined largely by the form of the boundary walls, because the radial velocity component of the gas at any particular radial distance from the axis of the vortex depends on the cross-sectional area available for radial flow at the radial distance. Any desired movement of these particles can thus be ensured by suitable design of the chamber walls and by suitable operating conditions.

As shown in the drawing the combustion chamber 1 is defined by boundary walls having a form such that the distance between a point on one wall and a corresponding oppositely located point on the opposite wall measured in the direction of the axis varies continuously from the periphery up to the outlet with varying radial distance of the points from this axis and is greater at smaller radii.

The form of the boundary wall defining the vortex chamber is also preferably such that the said axial distance between opposite walls is a function of the said radial distance, and preferably the boundary walls are of generally outwardly concave form, i. e. concave as viewed externally.

The dimensions of the fuel particles and of the combustion chamber 1 may be such that the radius of the equilibrium path of a particle issuing through opening 18 is radially greater than that of the ring of flame formed by particles which have already issued, so that the newly issuing particle is obliged to pass through this ring in order to reach its equilibrium path, and thereby becomes ignited. The pre-heating of the air-fuel mixture in the space 14 facilitates this ignition.

Within space 14 means may be provided to tap off part of the air from the air-fuel stream before it enters chamber 1. Such means may for example comprise a baffle 19 arranged near the periphery of the space 17. Due to their inertia, larger fuel particles tend to continue to move radially outwards through the space 17 and into chamber 1, while on the other hand some of the air carrying smaller fuel particles is deflected by baffle 19 through opening 20 into chamber 21 and this air may then be mixed with the primary air for preheating purposes, this primary air entering chamber 1 tangentially through opening 22 to produce the required vortex movement about the axis of chamber 1.

The fuel may be ignited for example by introducing a pilot jet of liquid fuel which is cut off once the solid fuel has been ignited. It is, of course, to be understood that in the application of the combustion system of the present invention to gas turbine plant, the air streams led into entries 6 and 22 are derived from the air delivery of the compressor.

The term "vitiated" air used herein is intended to mean air which has already been used for cooling purposes.

I claim:

A combustion system for burning pulverulent fuel comprising a combustion chamber of circular cross section having an outlet at one end, a baffle at the other end of said chamber, means defining with said baffle another chamber having a central inlet and marginal outlet leading to said combustion chamber, a jacket surrounding the side wall of said chamber and defining therewith an annular space of progressively decreasing cross sectional area, means to introduce air tangentially into said annular space at its end of larger cross sectional area, a volute having one end communicating with said annular space at its end of smaller cross sectional area, and ducting connecting the other end of said volute to the central inlet of said other chamber, a part of said ducting constituting eduction means for introducing pulverulent fuel into said ducting.

HANS A. HAVEMANN.

References Cited in the file of this patent

UNITED STATES PATENTS

| Number | Name | Date |
|---|---|---|
| 858,640 | Welles | July 2, 1907 |
| 1,618,808 | Burg | Feb. 22, 1927 |
| 1,676,511 | Wood | July 10, 1928 |
| 1,721,879 | Hazlehurst | July 23, 1929 |
| 1,918,397 | Jezler | July 18, 1933 |
| 2,434,298 | Truax | Jan. 13, 1948 |

FOREIGN PATENTS

| Number | Country | Date |
|---|---|---|
| 289,930 | Great Britain | Apr. 30, 1928 |
| 677,413 | France | Dec. 9, 1929 |